US012718581B2

(12) United States Patent
Christiansen

(10) Patent No.: US 12,718,581 B2
(45) Date of Patent: Aug. 25, 2026

(54) OPERATOR ASSISTANCE SYSTEM

(71) Applicant: AGCO International GmbH, Neuhausen (CH)

(72) Inventor: Martin Peter Christiansen, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 19/108,918

(22) PCT Filed: Sep. 8, 2023

(86) PCT No.: PCT/IB2023/058910
§ 371 (c)(1),
(2) Date: Mar. 5, 2025

(87) PCT Pub. No.: WO2024/062330
PCT Pub. Date: Mar. 28, 2024

(65) Prior Publication Data

US 2026/0080689 A1 Mar. 19, 2026

(30) Foreign Application Priority Data

Sep. 23, 2022 (GB) ...................................... 2213882

(51) Int. Cl.
*G06V 20/56* (2022.01)
*A01B 69/00* (2006.01)
(Continued)

(52) U.S. Cl.
CPC ............ *G06V 20/56* (2022.01); *A01B 69/001* (2013.01); *G01J 5/20* (2013.01); *G01J 5/48* (2013.01);
(Continued)

(58) Field of Classification Search
CPC ...... G06V 20/56; G06V 10/14; A01B 69/001; G01J 5/20; G01J 5/48; G01J 2005/0077; A01D 41/127
See application file for complete search history.

(56) References Cited

U.S. PATENT DOCUMENTS 10,275,662 B1 4/2019 Askeland
12,372,409 B2 * 7/2025 Tauber .................... G06T 7/593
(Continued)

FOREIGN PATENT DOCUMENTS

DE 102019008079 A1 8/2020
KR 20220081660 A 6/2022

OTHER PUBLICATIONS

UK Intellectual Property Office, Search Report for related UK Application No. GB2213881.2, dated Mar. 22, 2023, 3 pages.
(Continued)

*Primary Examiner* — Hussein Elchanti

(57) ABSTRACT

Methods and systems are provided for controlling operation of an operator assistance system for an agricultural machine. Image data is received from a thermal imaging sensor associated with the agricultural machine, where the thermal imaging sensor has an imaging region which, at least in part, includes a portion of the agricultural machine. The image data from the sensor is analysed to determine a thermal characteristic for the machine portion. The thermal characteristic is then used to control the assistance system, e.g. by utilising the determined characteristic to calibrate the thermal imaging sensor.

19 Claims, 3 Drawing Sheets

(51) Int. Cl.

| | |
|---|---|
| ***G01J 5/20*** | (2006.01) |
| ***G01J 5/48*** | (2022.01) |
| ***G06V 10/14*** | (2022.01) |
| *A01D 41/127* | (2006.01) |
| *G01J 5/00* | (2022.01) |

(52) U.S. Cl.
CPC ............ *G06V 10/14* (2022.01); *A01D 41/127* (2013.01); *G01J 2005/0077* (2013.01)

(56) References Cited

U.S. PATENT DOCUMENTS

| | | | | |
|---|---|---|---|---|
| 2014/0324272 | A1 | 10/2014 | Madsen et al. | |
| 2017/0088132 | A1 | 3/2017 | Sagemueller et al. | |
| 2018/0027179 | A1 | 1/2018 | Matsuzaki et al. | |
| 2018/0084708 | A1 | 3/2018 | Neitemeier et al. | |
| 2019/0057262 | A1* | 2/2019 | Sai | G08G 1/165 |
| 2020/0298844 | A1 | 9/2020 | Ikuta et al. | |
| 2021/0251148 | A1* | 8/2021 | Bonte | A01F 15/0841 |
| 2022/0101554 | A1* | 3/2022 | Fu | G06V 10/82 |
| 2022/0117158 | A1* | 4/2022 | Lamprecht | A01B 79/005 |
| 2022/0132829 | A1 | 5/2022 | Kwak et al. | |
| 2022/0159218 | A1* | 5/2022 | Wang | G06T 7/0012 |
| 2022/0230444 | A1 | 7/2022 | Edo et al. | |
| 2022/0240441 | A1* | 8/2022 | Hubner | A01C 7/105 |
| 2022/0346315 | A1* | 11/2022 | Edo | A01D 75/185 |
| 2022/0400598 | A1* | 12/2022 | Tamatani | A01B 63/008 |
| 2023/0014070 | A1* | 1/2023 | Gomiero | A01B 69/008 |
| 2023/0145541 | A1 | 5/2023 | Di Cecilia et al. | |
| 2026/0013415 | A1* | 1/2026 | Vandike | A01B 79/005 |

OTHER PUBLICATIONS

European Patent Office, Search Report for related PCT Application No. PCT/IB2023/058909, dated Dec. 7, 2023, 13 pages.

Osama Mazhar et al: “Glare or Gloom, I Can Still See You6—End-to-End Multi-Modal Object Detection”, IEEE Robotics and Automation Letters, 6(4), 6321-6328, 10 pages, 2021. https://doi.org/10.1109/LRA.2021.3093871.

Timo Korthals et al: “Multi-Modal Detection and Mapping of Static and Dynamic Obstacles in Agriculture for Process Evaluation”. Front. Robot. AI 5:28, 2018, 23 pages, doi: 10.3389/frobt.2018.00028.

Giulio Raina et al.: “Ambient awareness for agricultural robotic vehicles”, 2021, 25 pages, doi: 10.48550/arXiv.2104.05270.

* cited by examiner

OPERATOR ASSISTANCE SYSTEM

CROSS-REFERENCE TO RELATED APPLICATIONS

This application is a national stage entry of International Patent Application No. PCT/IB2023/058910, "Operator Assistance System," filed 2023 Sep. 8, which claims priority to U.K. Application No. 2213882.0, filed on 2022 Sep. 23; all of which is incorporated herein by reference.

FIELD

Embodiments of the present disclosure relate generally to an operator assistance system for an agricultural machine, and in particular for an operator assistance system incorporating a thermal imaging sensor.

BACKGROUND

Operator assistance systems for agricultural machines take a number of forms. In some instances, this can include incorporation of sensing technology onto the machine to provide additional information to an operator. This can include, for example, cameras or the like positioned about the machine to provide additional views to an operator. Other technologies may include LIDAR sensors or the like which advantageously provide information relating to depth in the image, e.g. distance to objects, etc.

Operating conditions can vary greatly during and between different agricultural operations. For instance, it may be beneficial to be able to provide an assistance system where the sensing technology can operate in low light conditions, such as at dusk or night. To date, no complete solution has been provided.

It would therefore be advantageous to provide an operator assistance system for an agricultural machine which incorporates a thermal imaging camera for assisting the operator in low light operating conditions.

BRIEF SUMMARY

An aspect of the invention provides a control system for an operator assistance system for an agricultural machine, the control system comprising one or more controllers, and being configured to: receive image data from a thermal imaging sensor associated with the agricultural machine, the thermal imaging sensor having an imaging region which, at least in part, includes a portion of the agricultural machine; analyse the image data from the sensor to determine a thermal characteristic for the machine portion; and generate and output one or more control signals for controlling the operator assistance system in dependence on the determined thermal characteristic.

Advantageously, the control system is able to utilise the presence of a portion of the agricultural machine within the imaging region of the thermal imaging sensor to control the assistance system (or components thereof, including the sensor itself). The portion of the agricultural machine is assumed to have a predictable and/or measurable thermal characteristic for a given operating condition, that being the temperature, a temperature profile and/or emissivity, for example. Accordingly, the portion of the agricultural machine can, for example, be used to calibrate the sensor; to determine a sensor error; and/or control a configuration of a user interface utilising the determined thermal characteristic, e.g. by selecting an appropriate colour scheme for a displayed representation based on the reference thermal characteristic obtained from the machine portion.

The control system may be configured to compare the determined thermal characteristic with a reference characteristic. The control system may be configured to generate and output the control signal(s) in dependence on the comparison.

The reference characteristic may comprise an instantaneous value for a given characteristic, such as a temperature or emissivity value for a given operating condition. The reference characteristic can include a characteristic profile, such as a temperature profile or model for given operating conditions, e.g. where the temperature of the machine portion increases (or decreases) in view of extended operation (or non-operation) of operable components of the machine. For instance, the temperature for an engine hood or cover may be expected to increase over time with engine operation up to an operating temperature for the machine/engine. The reference characteristic may be expected or be measured to change with operating conditions, e.g. due to changes in ambient temperature, wind direction and/or speed, etc. The reference characteristic profile may be modelled or measured and used in conjunction with the determined thermal characteristic in the manner discussed herein.

The reference characteristic may comprise an expected thermal characteristic or range for an expected thermal characteristic for the machine portion. The reference characteristic may comprise a measured thermal characteristic for the machine portion. For example, the control system may be configured to receive measurement data from one or more thermal sensors coupled or otherwise associated with the machine portion indicative of a measurable thermal characteristic for the machine portion. The one or more thermal sensors can include a thermistor or a resistance thermometer, for example, thermally coupled to the machine portion for measuring the reference characteristic.

The control system may be configured to calibrate the operator assistance system or one or more components thereof, e.g. the thermal imaging sensor, in dependence on the determined thermal characteristic for the machine portion.

The control system may be configured to generate and output one or more control signals for controlling operation of a user interface associated with the operator assistance system. The user interface may comprise a display terminal of or otherwise associated with the agricultural machine. The user interface may comprise a display screen of a remote user device, such as a smartphone, tablet or laptop computer, for example.

The control system may be configured to control the user interface to output an indicator in dependence on the determined thermal characteristic. The indicator may inform an operator of the machine of a need to calibrate the operator assistance system, or one or more components thereof such as the thermal imaging sensor, for example.

The thermal imaging sensor may comprise a thermal camera.

The thermal characteristic may comprise one or more of: a temperature value; a temperature profile (e.g. a measure of a rate of change of temperature over time with operation) and an emissivity value.

The portion of the agricultural machine may comprise an outer surface of the machine. This may include an engine cover or hood of the machine, for example.

The control system may be configured to receive ambient temperature data from an ambient temperature sensor provided on the machine or otherwise associated with the working environment of the machine, the data being indicative of an ambient temperature of the operating environment for the machine. The ambient temperature may be used to determine the expected reference characteristic for the machine portion.

The control system may be configured to receive operational data from a machine control unit. The operational data may include data indicative of an operational speed of the machine, such as a forward speed of the machine, for example. The control system may be configured to utilise the forward speed of the machine to determine the expected reference characteristic for the machine portion, e.g. to account for wind effect on the temperature profile for the machine portion.

Another aspect of the invention provides an operator assistance system for an agricultural machine, comprising a control system of the preceding aspect of the invention; and a thermal imaging sensor.

The operator assistance system may additionally include a user interface. The user interface may comprise a display terminal. For example, this may include a display terminal of the agricultural machine, such as a display terminal provided within an operator cab of the machine. The user interface may comprise a display screen on a remote user device, such as a smartphone, tablet computer or the like.

A further aspect of the disclosure provides a method of controlling operation of an operator assistance system for an agricultural machine, comprising: receiving image data from a thermal imaging sensor associated with the agricultural machine, the thermal imaging sensor having an imaging region which, at least in part, includes a portion of the agricultural machine; analysing the image data from the sensor to determine a thermal characteristic for the machine portion; and controlling the operator assistance system in dependence on the determined thermal characteristic.

The method may comprise performing one or more operable functions of any component of the control system or system in the manner discussed herein.

In a further aspect there is provided an agricultural machine comprising the control system and/or system of any preceding aspect of the invention, and/or configured to perform the method according to the preceding aspect of the invention.

Optionally, the agricultural machine comprises a combine harvester or a tractor.

A further aspect provides computer software which, when executed by one or more processors, causes performance of a method described herein.

A yet further aspect provides a non-transitory computer readable storage medium comprising computer software described herein.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Figure 1:
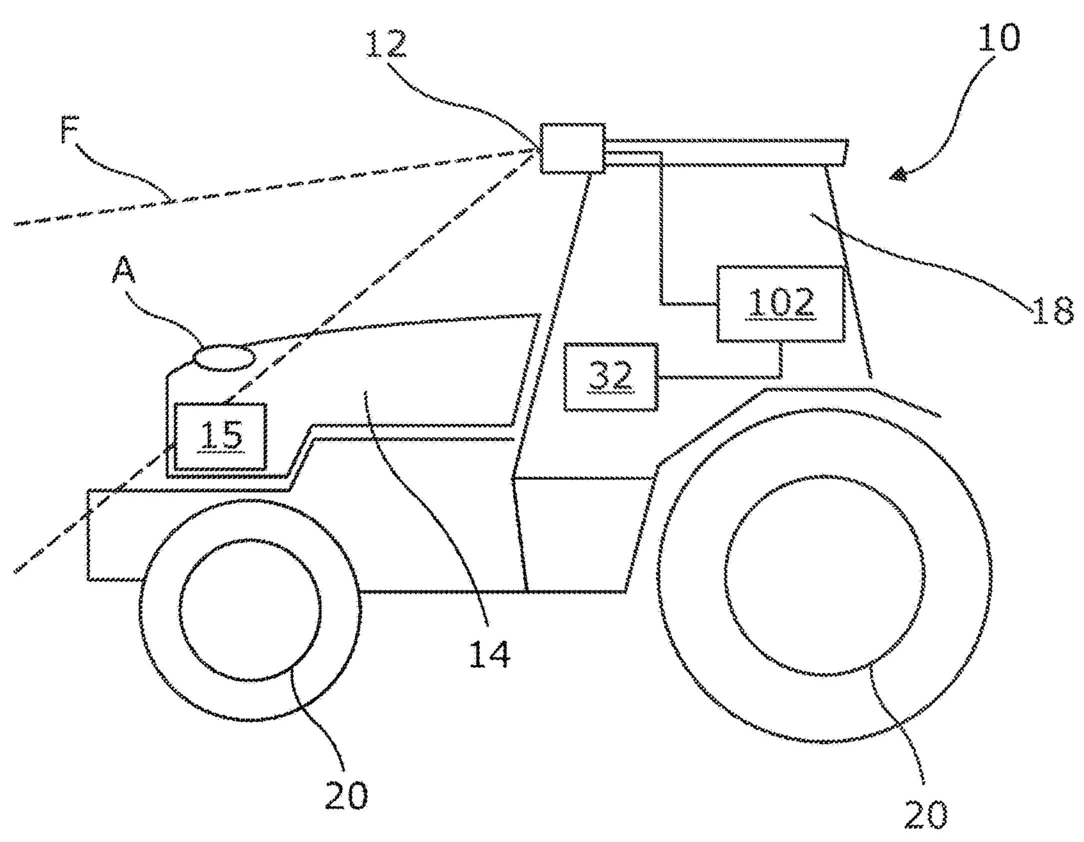
FIG. 1 is a schematic representation of an agricultural machine embodying aspects of the present disclosure.
Figure 2:
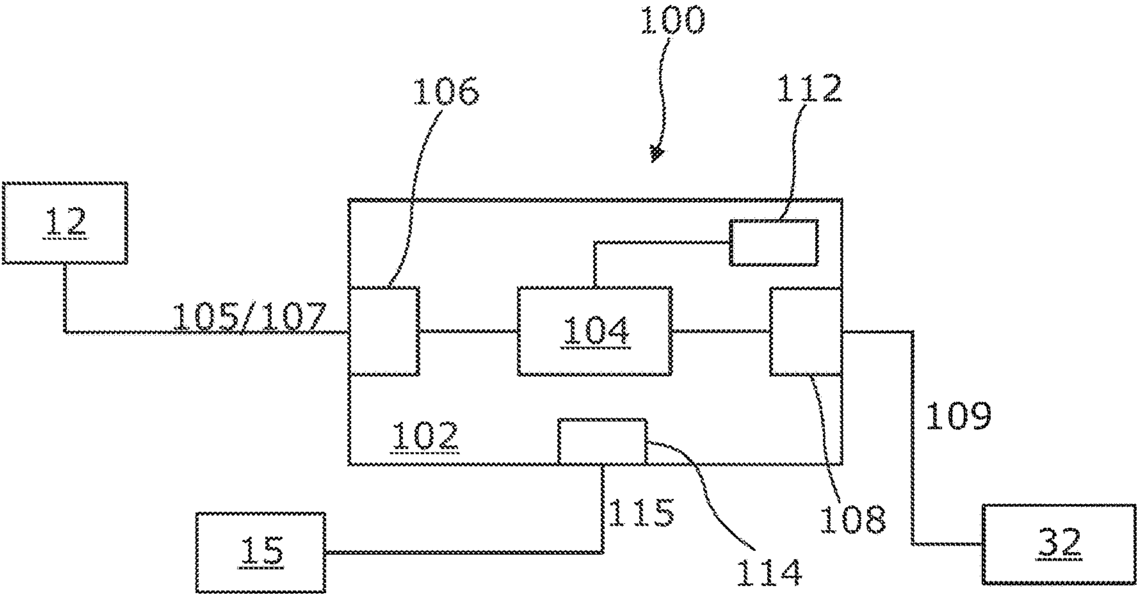
FIG. 2 is a schematic representation of an embodiment of a control system.

The present disclosure relates in general to a tractor 10, and to a control system 100 and method 200 for controlling operation of one or more components of or associated with the tractor 10, specifically here a user interface, e.g. display terminal 32 provided within an operator cab 18 of the tractor 10, of an operator assistance system 50 of the tractor 10. The present disclosure utilises a thermal imaging sensor 12 and analysis of the data obtained therefrom to control operation of the assistance system 50. In particular, the present disclosure utilises a reference point A within the image data obtained from the thermal imaging sensor 12 to control, calibrate and/or analyse operation of the sensor 12, in turn controlling an output provided to an operator via display terminal 32 of the assistance system 50 for providing additional (and reliable) situational information to the operator.

Tractor

FIG. 1 illustrates an agricultural machine, specifically here a tractor 10. The tractor 10 includes, amongst other components, a power unit, wheels 20, and an operator cab 18. A user interface in the form of a display terminal 32 is provided within the operator cab 18 for providing operational information to an operator of the tractor 10.

A thermal imaging sensor 12 is mounted or otherwise coupled to the tractor 10 and has an imaging region F forward of the tractor 10. As shown figuratively in FIG. 1, the imaging region F at least partly includes a portion of the tractor 10 serving as a reference point A for the arrangement, here being a portion of an engine cover 14 of the tractor 10. As discussed herein, the present disclosure advantageously analyses a thermal characteristic of the reference point A for controlling operation of an assistance system 50, or components thereof including the user interface 32 and/or the thermal imaging sensor 12 itself.

A thermal sensor 15 is provided which is thermally coupled to the engine cover 14 and is operable, as discussed herein, for providing a measured reference thermal characteristic for the engine cover 14.

Control System

The tractor 10 embodies a control system 100 operable to control operation of one or more components of (or associated with) the tractor 10, specifically here the assistance system 50 or components thereof.

The control system 100 comprises a controller 102 having an electronic processor 104, an electronic input/output 106, an electronic input 114, an electronic output 108 and memory 112. The processor 104 is operable to access the memory 112 and execute instructions stored therein to perform given functions, specifically to cause performance of the method 200 of FIG. 3 in the manner described hereinbelow, and ultimately, in the illustrated embodiment, generate and output a control signal(s) 109 from output 108 for controlling operation of a display terminal 32 of the tractor 10 following analysis of image data received at electronic inputs 106 from the thermal imaging sensor 12.

In an extension, the processor 104 may be operable to access the memory 112 and execute instructions therein to generate and output control signals 107 for controlling operation of the thermal imaging sensor 12 in dependence on the image data received therefrom, which can include a recalibration of the sensor 12.

Here, the processor 104 is operable to receive signals from the thermal imaging sensor 12 where the signals comprise image data from the sensor 12 indicative of an environment about the tractor 10. In this illustrated embodiment, the image data includes data indicative of imaging region F and objects therein. The signals from the sensor 12 is in the form of an input signal 105 received at electronic input/output 106 of controller 102.

Processor 104 is additionally operable to receive signals from a thermal sensor 15, where the signals comprise thermal data from the thermal sensor 15 indicative of a temperature characteristic for the machine portion 14. Signals from the sensor 15 are in the form of an input signal 115 received at electronic input 114 of the controller 102.

Control signals 109 are output via electronic output 108 to display terminal 32, and specifically to a control unit thereof for configuring the display terminal 32 and any imagery displayed thereby in dependence on image data from the sensor 12. This can include reconfiguring the display terminal 32 (e.g. adjusting a colour scheme thereof) and/or providing an indicator to the operator indicative of operation of the control system 100 or components of or associated therewith. This may include, as discussed herein, an indication of the need to recalibrate the thermal imaging sensor 12, for example.

Method

Figure 3:
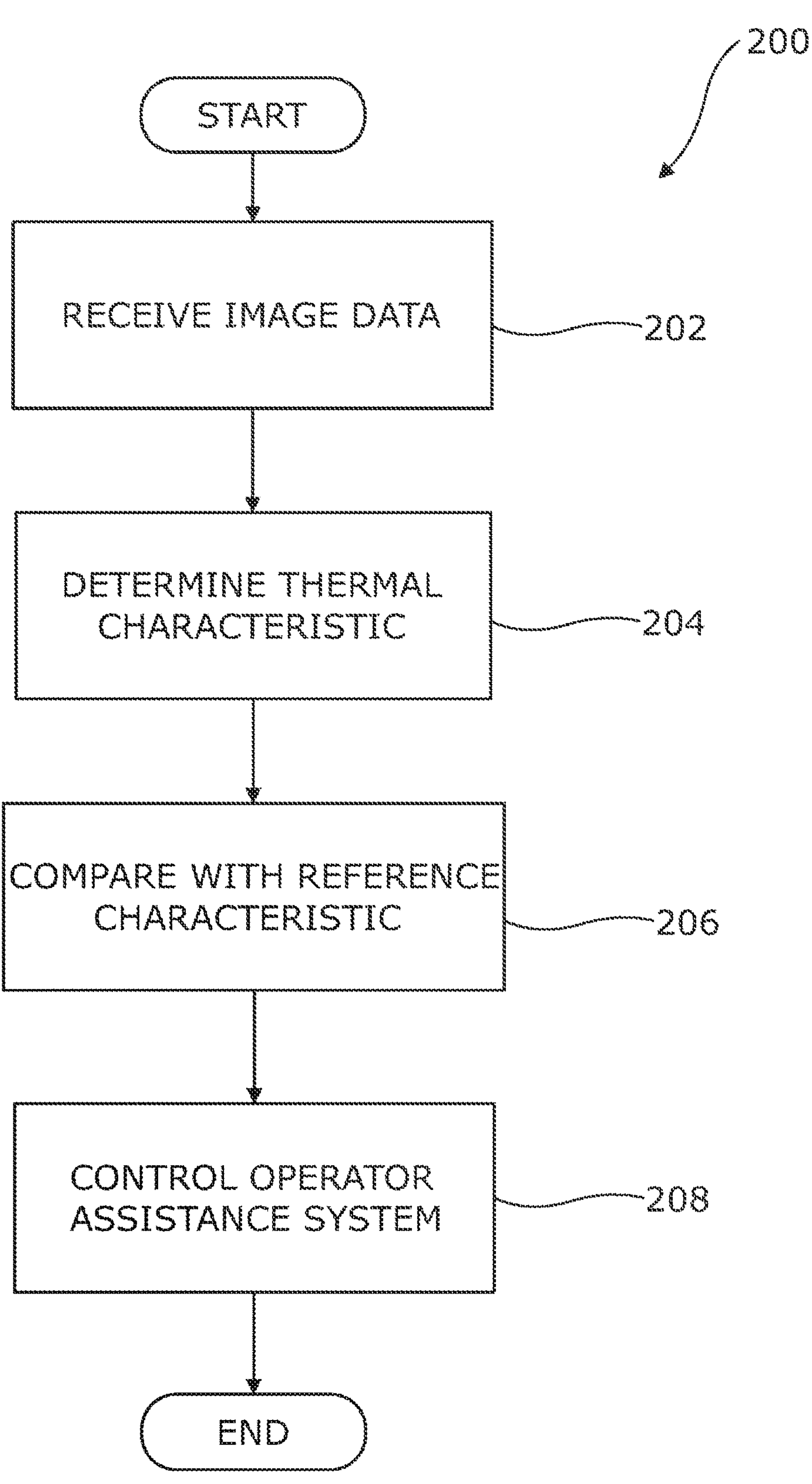
FIG. 3 is a flowchart illustrating am embodiment of a method.

An embodiment of a method 200 is shown in FIG. 3.

At step 202, image data is received from the imaging sensor 12, here comprising thermal imaging sensor 12. The image data include data indicative of imaging region F, including reference point A which is a portion of an engine cover 14 of the tractor 10.

The image data is analysed (step 204) to determine a thermal characteristic for the machine portion at reference point A. As discussed herein, this thermal characteristic may comprise a measure of a temperature and/or emissivity value for the machine portion at reference point A as determined from the image data received from thermal imaging sensor 12.

This is then compared with a reference thermal characteristic (step 206). Here, the reference thermal characteristic comprises a measured thermal characteristic as determined from sensor data received from the temperature sensor 15. In an alternative arrangement, the reference thermal characteristic may include an expected thermal characteristic (e.g. temperature and/or emissivity) for the particular machine portion. As discussed herein, this may include an expected temperature profile for the machine portion depending on operating conditions for the tractor 10, including an ambient temperature, operating time, wind direction and/or speed, operational speed of the tractor 10, etc. The reference characteristic is stored in memory 112 of the controller 102 and may be predefined based on known thermal characteristics for the machine portion.

In an extension, the reference characteristic may vary with operating conditions. For example, it may be that the thermal response for the machine portion varies with ambient temperature, whether the machine portion is in direct sunlight or not, and an operating parameter for the tractor 10, including time of use. For instance, it may be that the machine portion, and particularly the engine cover 14 may increase with temperature depending on how long the tractor 10 has been operating for. Accordingly, the reference characteristic may comprise a range of expected values for the thermal characteristic of the machine portion which is dependent on multiple contributing factors, including operational parameters of the tractor 10 itself. Each of the additional operating parameters may be sensed directly on the tractor 10 and/or be retrieved from a data store, including via a data connection to a remote server (e.g. to determine an ambient temperature, weather conditions etc.).

At step 208, the operator assistance system 50 (or components thereof, including the thermal imaging sensor 12 and/or the display terminal 32) are controlled based on the comparison of the measured thermal characteristic with the reference characteristic. Where no difference is determined, or where the measured characteristic is within a determined tolerance/range of the expected/reference characteristic no action may be taken. Where the determined characteristic differs, step 208 may include recalibrating the thermal imaging sensor 12, controlling a configuration of the display terminal 32, e.g. to adjust a colour scheme for the display terminal which may include adjusting colour values for the machine portion within any representation of the image data provided by the display terminal 32 to ensure consistency for an operator; and/or outputting an indicator via the display terminal 32 of a need to recalibrate the thermal imaging sensor 12.

In some instances, the present arrangement and method 200 may be used to determine a fault with the thermal imaging sensor 12. In such instances, an appropriate indicator may be output, e.g. via display terminal 32 notifying an operator of the tractor 10.

EXAMPLES

Figure 4:
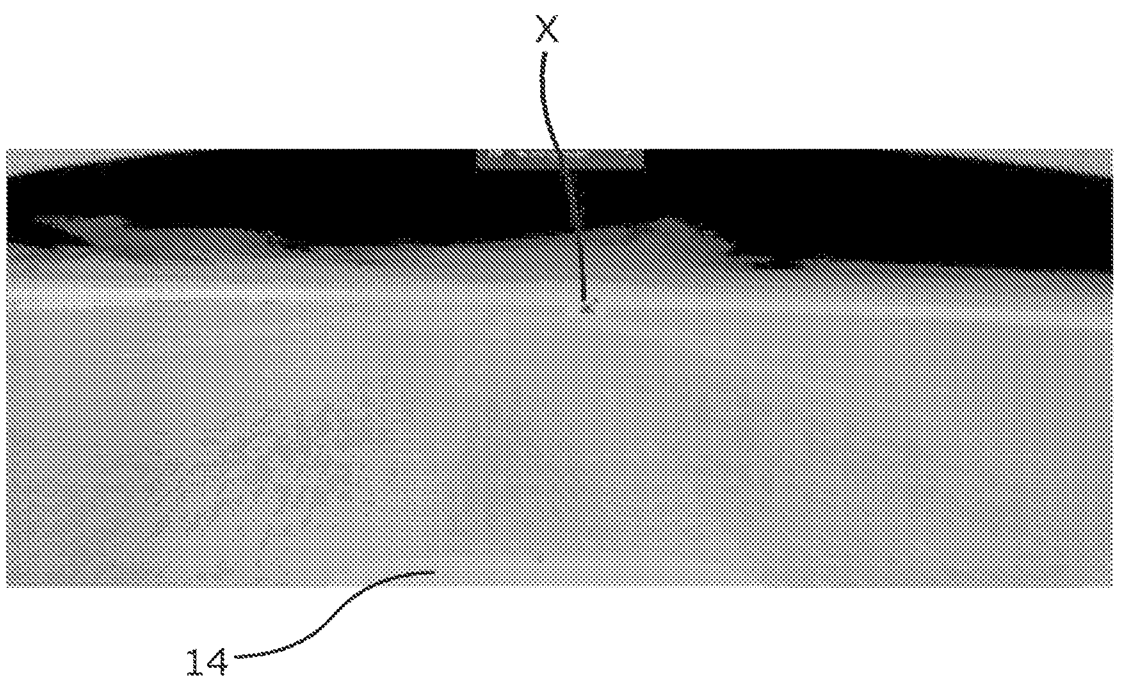
FIG. 4 illustrates a representation of image data obtained utilising embodiment(s) of the present disclosure.
Figure 5:
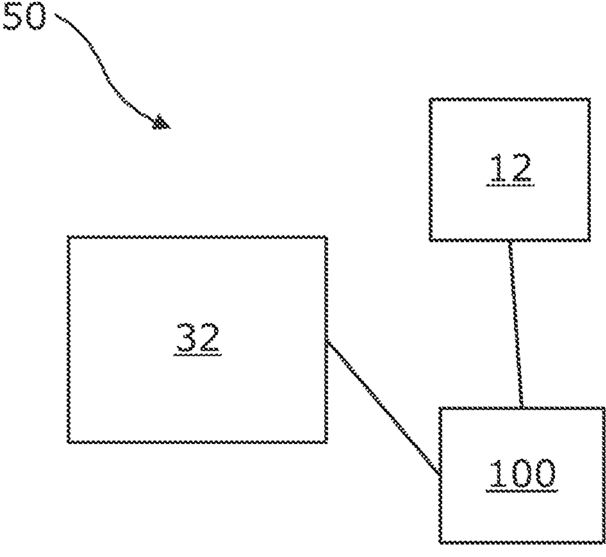
FIG. 5 illustrates schematically an embodiment of an operator assistance system.

FIG. 4 illustrates an example representation provided by display terminal 32. This includes a generated representation of image data obtained by the thermal imaging sensor 12, and illustrates the presence of the machine portion, here engine cover 14 within the image data and subsequently generated representation. FIG. 4 also illustrates identification of an object X, here a further vehicle operating in the same environment and how this is shown within the representation provided to the operator. Through calibration of the thermal imaging sensor 12 in the manner discussed herein, the representation shown to an operator can be controlled in a manner such that objects of note within the environment of the tractor 10 can be clearly highlighted to an operator.

GENERAL

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

All references cited herein are incorporated herein in their entireties. If there is a conflict between definitions herein and in an incorporated reference, the definition herein shall control.

What is claimed is:

1. A control system for an operator assistance system for an agricultural machine, the control system comprising one or more controllers, and being configured to:

receive image data from a thermal imaging sensor associated with the agricultural machine, the thermal imaging sensor having an imaging region which, at least in part, includes a portion of the agricultural machine;

analyze the image data from the sensor to determine a thermal characteristic for the machine portion; and generate and output one or more control signals for controlling the operator assistance system in dependence on the determined thermal characteristic.

2. A control system as claimed in claim 1, configured to compare the determined thermal characteristic with a reference characteristic.

3. A control system as claimed in claim 2, wherein the reference characteristic comprises a measured thermal characteristic for the machine portion.

4. A control system as claimed in claim 3, configured to receive measurement data from one or more thermal sensors thermally coupled or otherwise associated with the machine portion indicative of a measurable thermal characteristic for the machine portion.

5. A control system as claimed in claim 4, wherein the one or more thermal sensors include a thermistor or a resistance thermometer thermally coupled to the machine portion for measuring the reference characteristic.

6. A control system as claimed in claim 2, configured to generate and output the control signal(s) in dependence on the comparison.

7. A control system as claimed in claim 1, configured to calibrate the operator assistance system or one or more components thereof in dependence on the determined thermal characteristic for the machine portion.

8. A control system as claimed in claim 2, wherein the reference characteristic comprises an expected thermal characteristic or range for an expected thermal characteristic for the machine portion.

9. A control system of claim 1, configured to generate and output one or more control signals for controlling operation of a user interface associated with the operator assistance system.

10. A control system of claim 9, wherein the user interface comprises a display terminal of or otherwise associated with the agricultural machine, or a display screen of a remote user device.

11. A control system of claim 9, configured to control the user interface to output an indicator in dependence on the determined thermal characteristic.

12. A control system of claim 11, wherein the indicator informs an operator of the machine of a need to calibrate the operator assistance system, or one or more components thereof.

13. A control system of claim 1, wherein the thermal imaging sensor comprises a thermal camera.

14. A control system of claim 1, wherein the thermal characteristic comprises one or more of: a temperature value; a temperature profile; and an emissivity value.

15. A control system of claim 1, wherein the portion of the agricultural machine comprises an outer surface of the machine.

16. A control system of claim 15, wherein the portion comprises an engine cover or hood of the machine.

17. An operator assistance system for an agricultural machine, comprising a control system of claim 1; and a thermal imaging sensor.

18. An agricultural vehicle comprising or being controllable by a control system of claim 1.

19. A method of controlling operation of an operator assistance system for an agricultural machine, comprising:

receiving image data from a thermal imaging sensor associated with the agricultural machine, the thermal imaging sensor having an imaging region which, at least in part, includes a portion of the agricultural machine;

analyzing the image data from the sensor to determine a thermal characteristic for the machine portion; and controlling the operator assistance system in dependence on the determined thermal characteristic.

* * * * *